(12) United States Patent
Fu et al.

(10) Patent No.: US 11,483,780 B2
(45) Date of Patent: Oct. 25, 2022

(54) METHOD AND APPARATUS FOR RECEIVING DOWNLINK REFERENCE SIGNAL IN WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN); Yingjie Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 16/337,337

(22) PCT Filed: Sep. 27, 2017

(86) PCT No.: PCT/KR2017/010708
§ 371 (c)(1),
(2) Date: Mar. 27, 2019

(87) PCT Pub. No.: WO2018/062842
PCT Pub. Date: Apr. 5, 2018

(65) Prior Publication Data
US 2020/0037329 A1 Jan. 30, 2020

(30) Foreign Application Priority Data

Sep. 27, 2016 (CN) .......................... 201610857538.3
Sep. 29, 2016 (CN) .......................... 201610867885.4

(51) Int. Cl.
*H04W 72/04* (2009.01)
*H04W 56/00* (2009.01)
*H04L 5/00* (2006.01)
*H04L 5/10* (2006.01)
(Continued)

(52) U.S. Cl.
CPC ......... *H04W 56/001* (2013.01); *H04L 5/0048* (2013.01); *H04L 5/0051* (2013.01);
(Continued)

(58) Field of Classification Search
CPC ........... H04W 72/0493; H04W 56/001; H04W 72/042; H04W 80/08; H04W 72/0446;
(Continued)

(56) References Cited

U.S. PATENT DOCUMENTS 9,253,782 B2 * 2/2016 Xu ...................... H04W 72/048
2011/0158114 A1 6/2011 Novak et al.
(Continued)

FOREIGN PATENT DOCUMENTS

CN 1585392 A 2/2005
CN 101374270 A 2/2009
(Continued)

OTHER PUBLICATIONS

Office Action dated Apr. 9, 2020 in connection with Chinese Patent Application No. 201610867885.4, 24 pages.
(Continued)

*Primary Examiner* — Mounir Moutaouakil

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for operating a terminal in a wireless communication system, the method comprises determining a time-frequency structure of a downlink reference signal, and receiving, from a base station, the downlink reference signal according to the time-frequency structure.

16 Claims, 19 Drawing Sheets

[Fig. 2]

(51) Int. Cl.
*H04L 27/26* (2006.01)
*H04W 80/08* (2009.01)

(52) U.S. Cl.
CPC .............. *H04L 5/0094* (2013.01); *H04L 5/10* (2013.01); *H04L 27/2607* (2013.01); *H04L 27/2613* (2013.01); *H04L 27/26025* (2021.01); *H04W 72/042* (2013.01); *H04W 72/0493* (2013.01); *H04W 80/08* (2013.01)

(58) Field of Classification Search
CPC .............. H04W 72/0453; H04L 5/0051; H04L 5/0094; H04L 5/10; H04L 27/2607; H04L 27/26025; H04L 5/0007; H04L 5/0048; H04L 27/2613; H04L 27/2666; H04L 5/005; H04L 27/2678
See application file for complete search history.

(56) References Cited

U.S. PATENT DOCUMENTS

| | | | |
|---|---|---|---|
| 2013/0250878 | A1 | 9/2013 | Sayana et al. |
| 2013/0259009 | A1 | 10/2013 | Berggren et al. |
| 2013/0301565 | A1* | 11/2013 | Xu .................. H04W 76/16 370/329 |
| 2014/0044054 | A1 | 2/2014 | Kim et al. |
| 2014/0369243 | A1 | 12/2014 | Guo et al. |
| 2015/0351063 | A1 | 12/2015 | Charbit et al. |
| 2015/0373694 | A1 | 12/2015 | You et al. |
| 2015/0381331 | A1 | 12/2015 | Kim et al. |
| 2018/0020462 | A1* | 1/2018 | Xiong .................. H04B 7/0417 |
| 2018/0091249 | A1* | 3/2018 | Han .................. H04L 27/26025 |
| 2018/0249463 | A1* | 8/2018 | Huang .................. H04L 5/0048 |
| 2020/0037329 | A1 | 1/2020 | Fu et al. |
| 2021/0068191 | A1* | 3/2021 | Liu .................. H04L 1/0061 |

FOREIGN PATENT DOCUMENTS

| | | |
|---|---|---|
| CN | 102223642 A | 10/2011 |
| CN | 103096368 A | 5/2013 |
| CN | 103873124 A | 6/2014 |
| CN | 104854936 A | 8/2015 |
| EP | 2685662 A1 | 1/2014 |
| WO | 2012065033 A1 | 5/2012 |

OTHER PUBLICATIONS

ISA/KR, "International Search Report and Written Opinion of the International Searching Authority," Application No. PCT/KR2017/010708, dated Dec. 21, 2017, 12 pages.

3GPP TS 38.211 V15.3.0 (Sep. 2018), Technical Specification, 3rd Generation Partnership Project; Technical Specification Group Radio Access Network; NR; Physical channels and modulation (Release 15), Sep. 2018, 96 pages.

3GPP TS 38.212 V15.3.0 (Sep. 2018), Technical Specification, 3rd Generation Partnership Project; Technical Specification Group Radio Access Network; NR; Multiplexing and channel coding (Release 15), Sep. 2018, 99 pages.

3GPP TS 38.214 V15.3.0 (Sep. 2018), Technical Specification, 3rd Generation Partnership Project; Technical Specification Group Radio Access Network; NR; Physical layer procedures for data (Release 15), Sep. 2018, 96 pages.

3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15), Dec. 2018, 474 pages.

Second Office Action dated Dec. 14, 2020 in connection with Chinese Application No. 201610867885.4, 10 pages.

Mediatek Inc., "Discussion on Supported Carrier Bandwidth for Forward Compatible NR design" R1-167541, 3GPP TSG RAN WG1 Meeting #86, Gothenburg, Sweden, Aug. 22-26, 2016, 5 pages.

China National Intellectual Property Administration, "Notification of Granting of Patent Right to Invention" in connection with Chinese Patent Application No. CN201610867885.4, dated Aug. 3, 2021, 8 pages.

Wang et al., "An efficient design of LTE reference signal and performance analysis", Journal of China University of Metrology, vol. 22, No. 4, Dec. 2011, Chinese Academic Journal Electronic Publishing House, 10 pages.

Korea Intellectual Property Office, "Notice of Preliminary Rejection," dated Aug. 17, 2022, in connection with Korean Patent Application No. KR10-2019-7012417, 12 pages.

Panasonic, "Use of multiple numerologies in NR," 3GPP TSG RAN WG1 Meeting #86, R1-167439, Gothenburg, Sweden, Aug. 22-26, 2016, 9 pages.

LG Electronics, "Subframe and mini-subframe definition for frame structure of NR," 3GPP TSG RAN WG1 Meeting #86, R1-166881, Gothenburg, Sweden, Aug. 22-26, 2016, 8 pages.

Nokia et al., "On flexible RS design principles," 3GPP TSG RAN WG1 Meeting #86, R1-167264, Gothenburg, Sweden, Aug. 22-26, 2016, 3 pages.

\* cited by examiner

[Fig. 1]
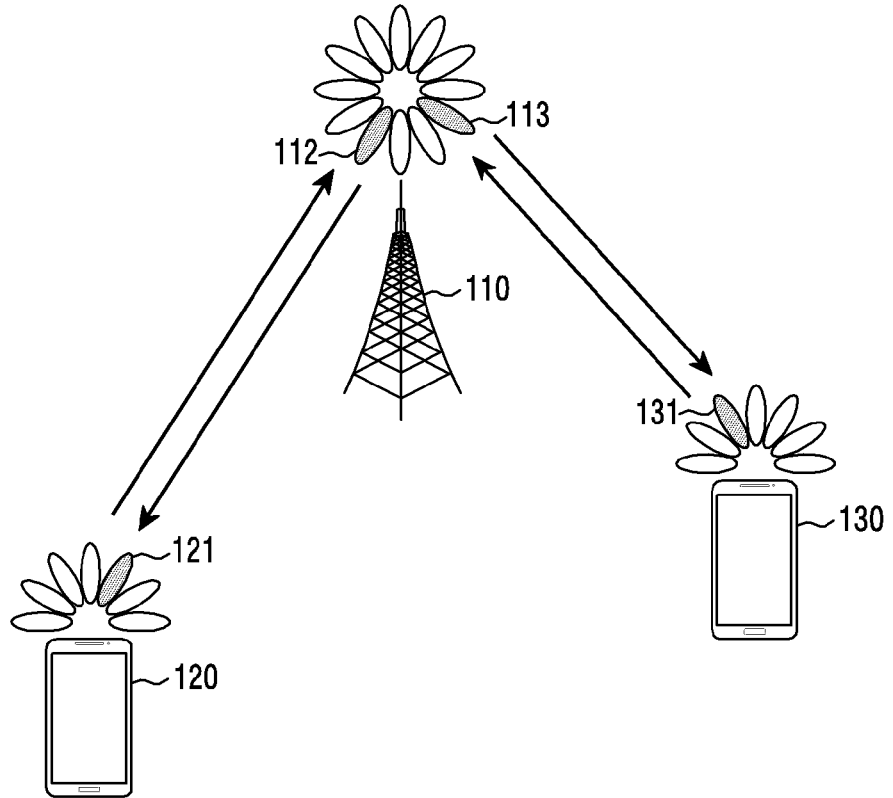
[Fig. 2]
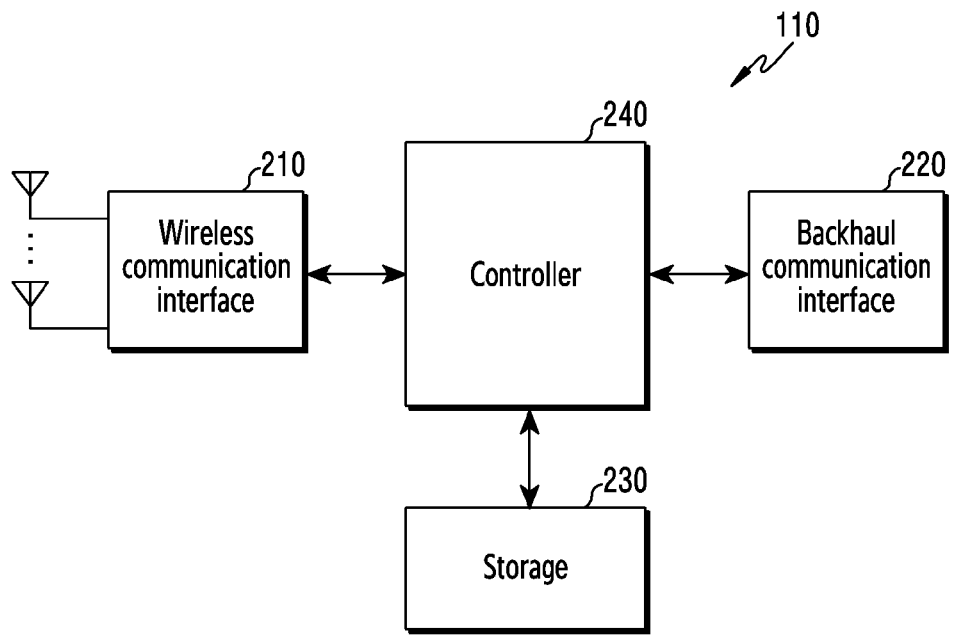

[Fig. 3]
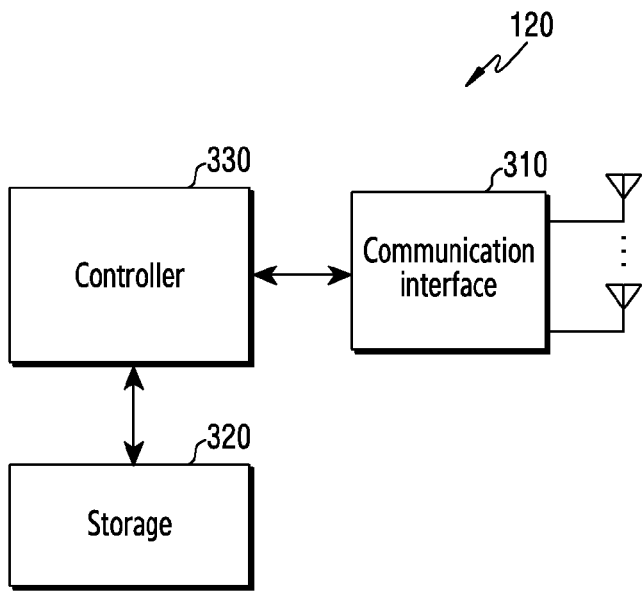
[Fig. 4]
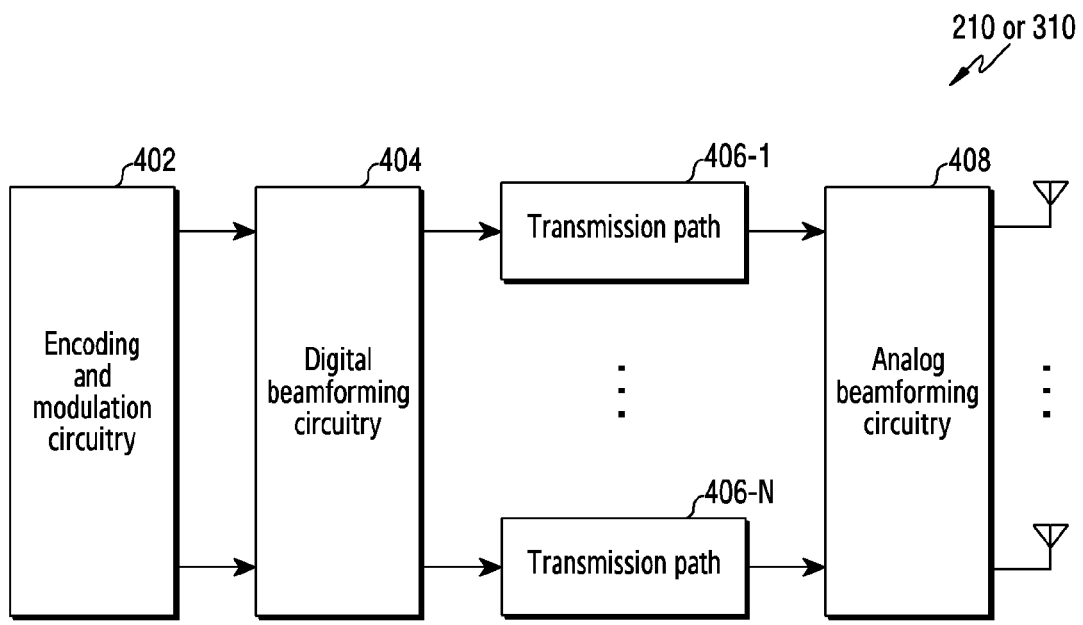

[Fig. 5]
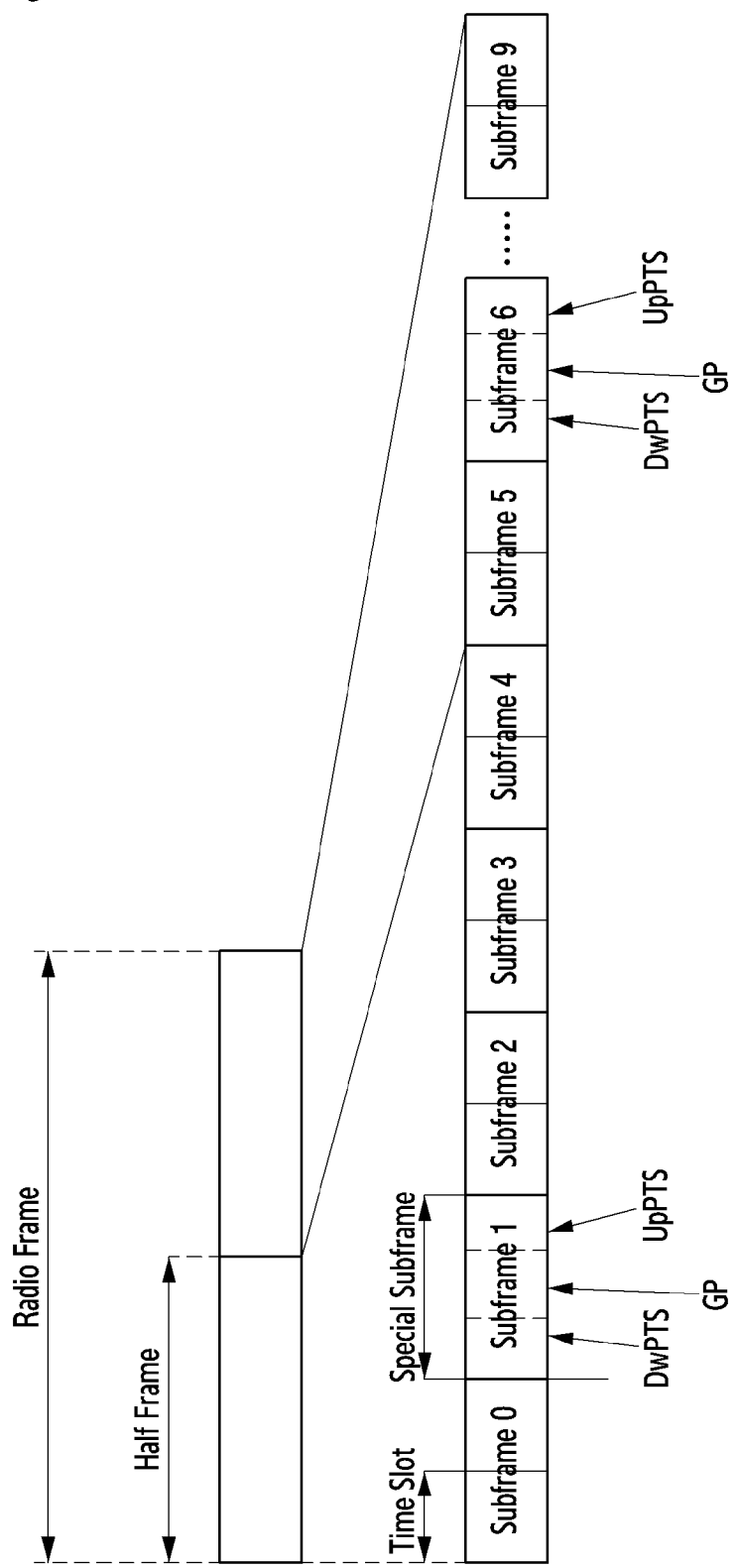

[Fig. 6]
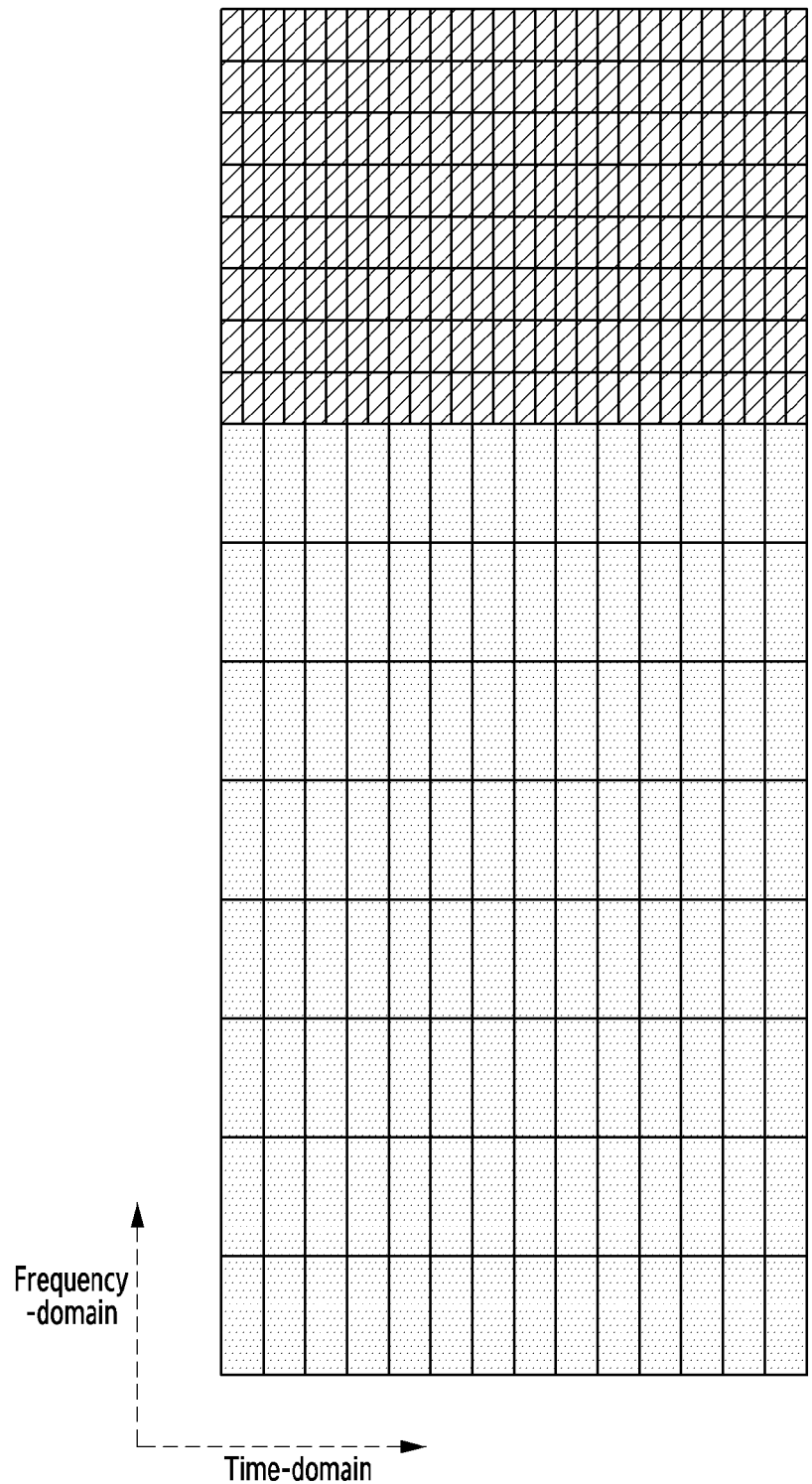

[Fig. 7]
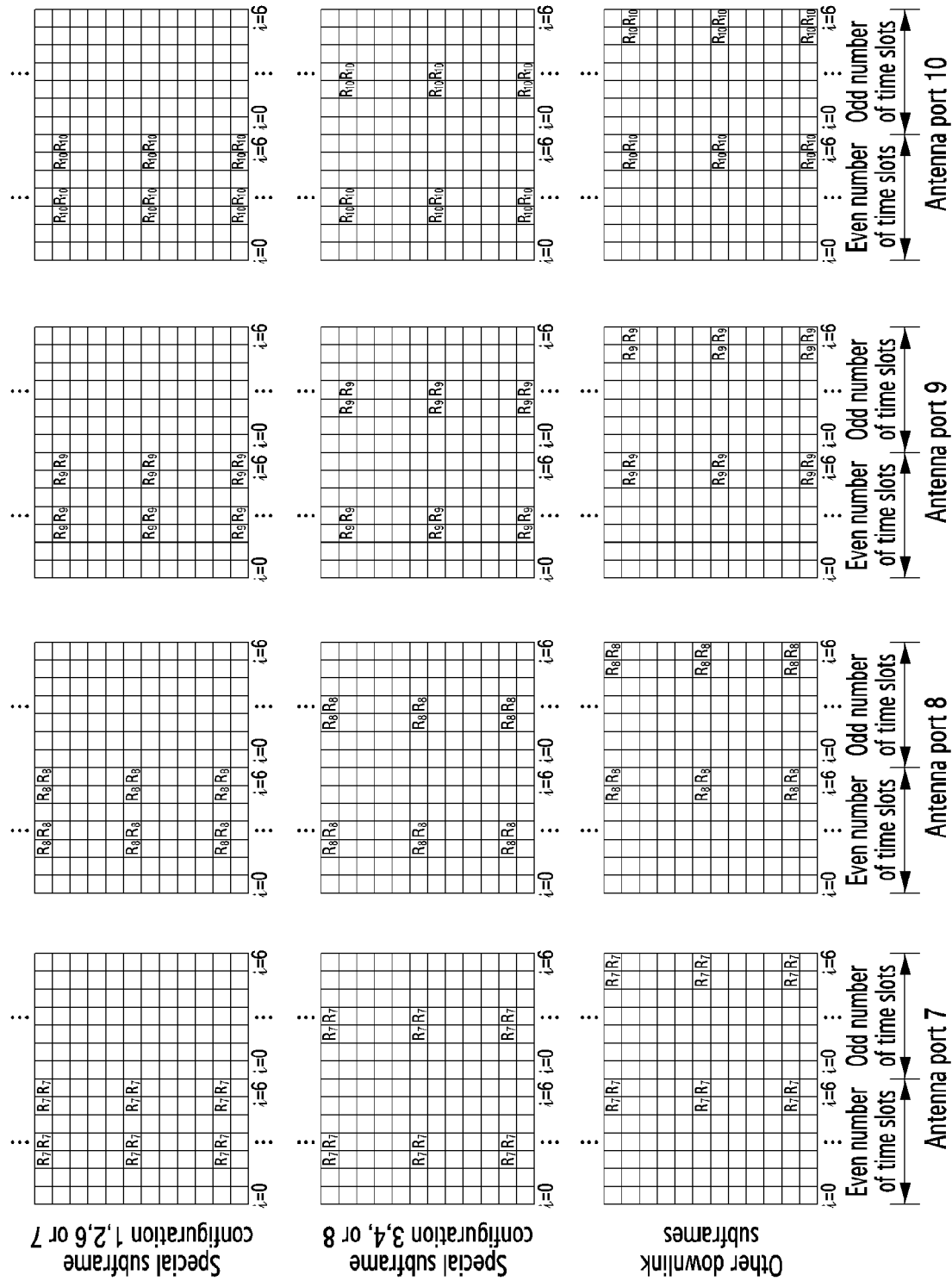

[Fig. 8]
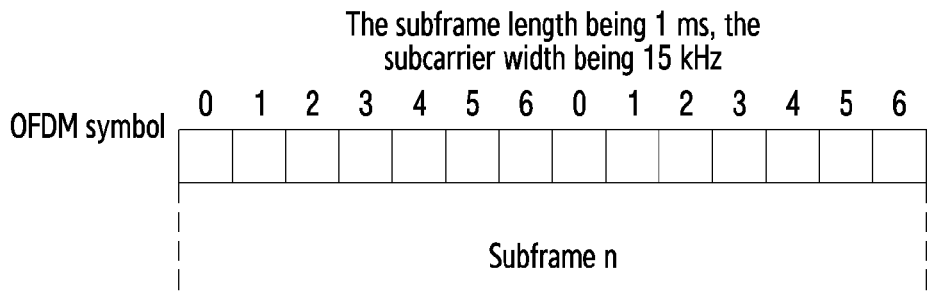
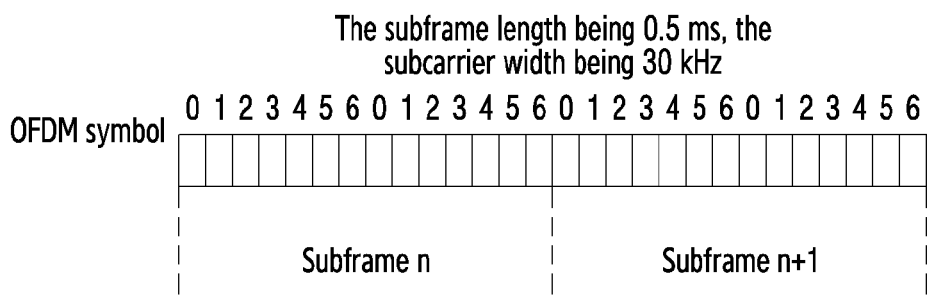
[Fig. 9]
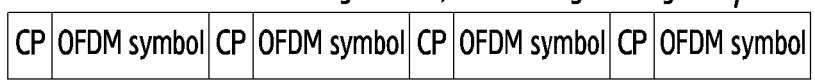
[Fig. 10]

[Fig. 11A]
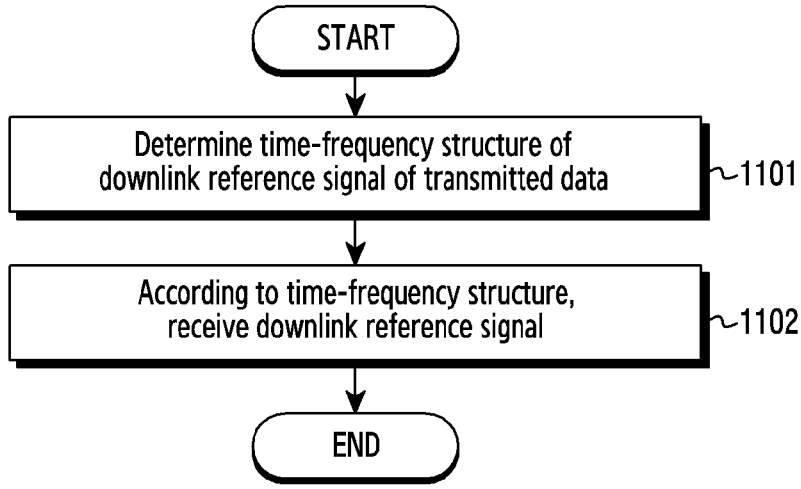
[Fig. 11B]
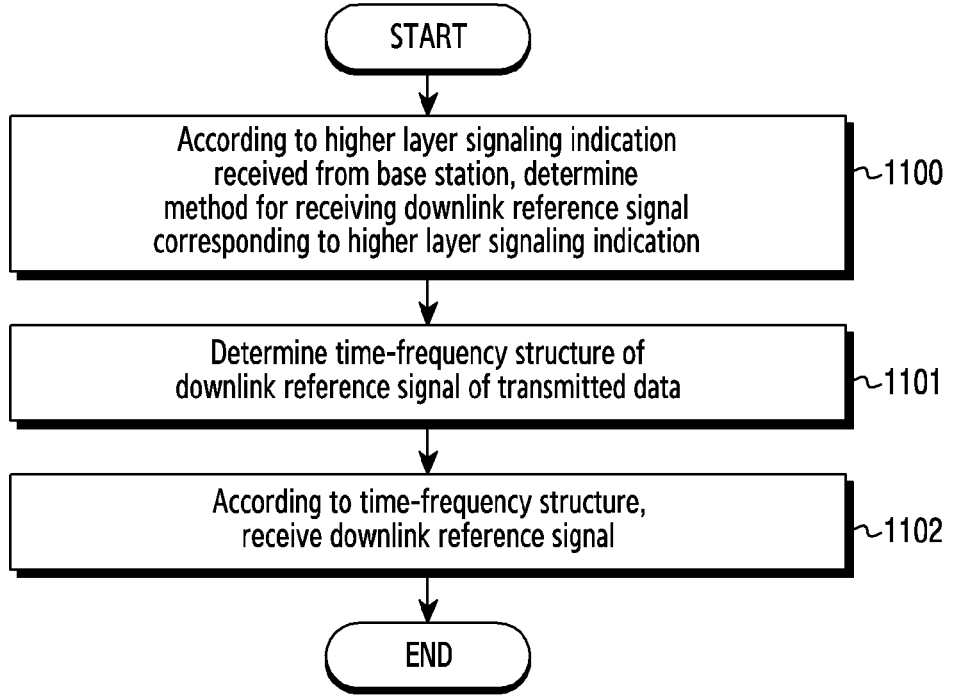

[Fig. 12]
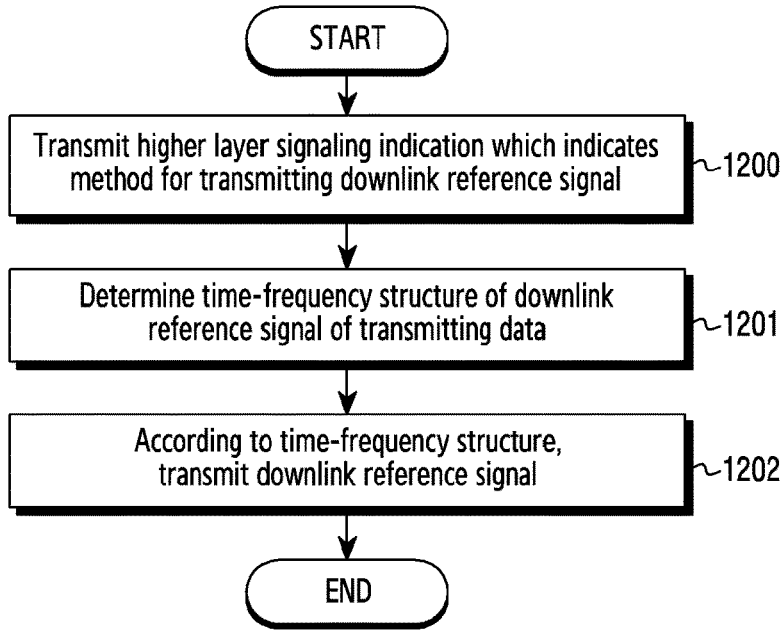
[Fig. 13]
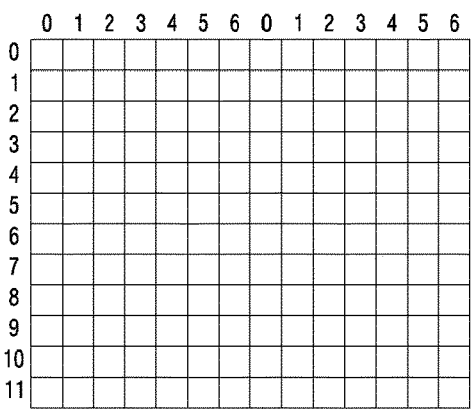
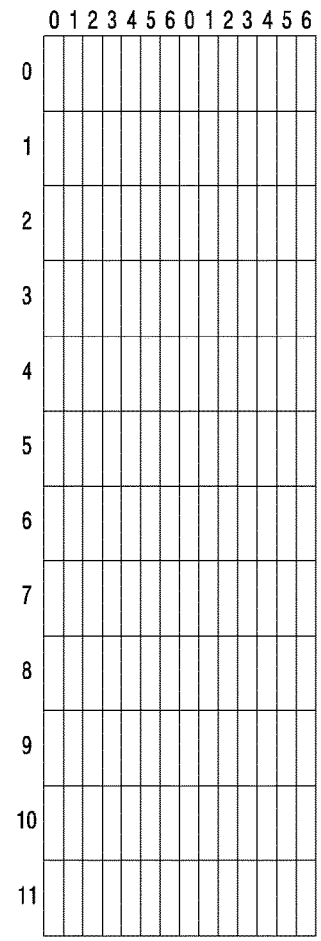

[Fig. 14]
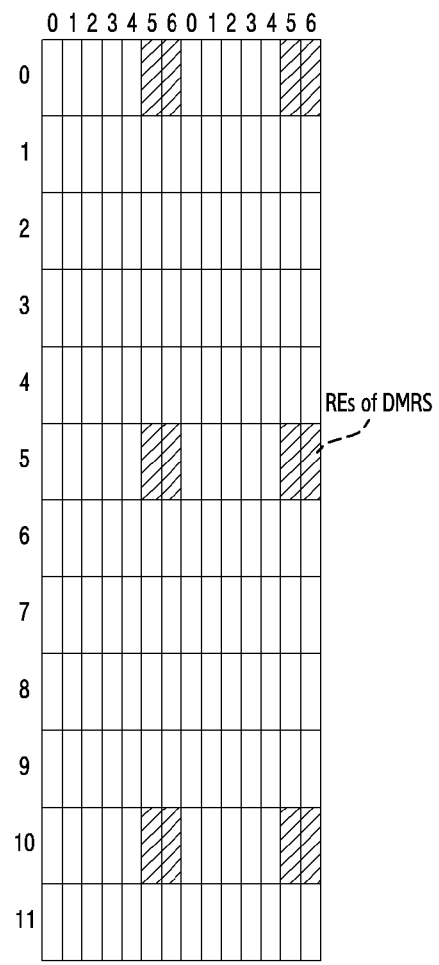
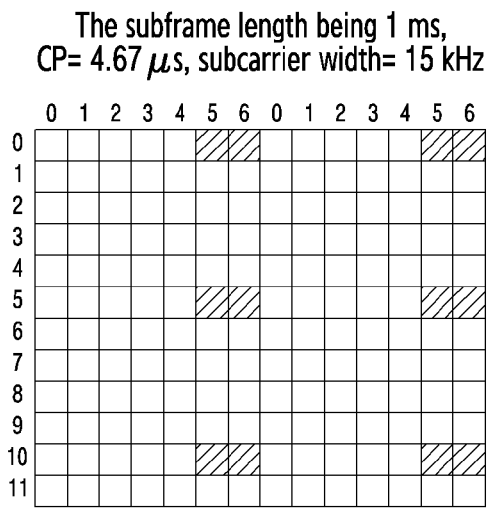

[Fig. 15]
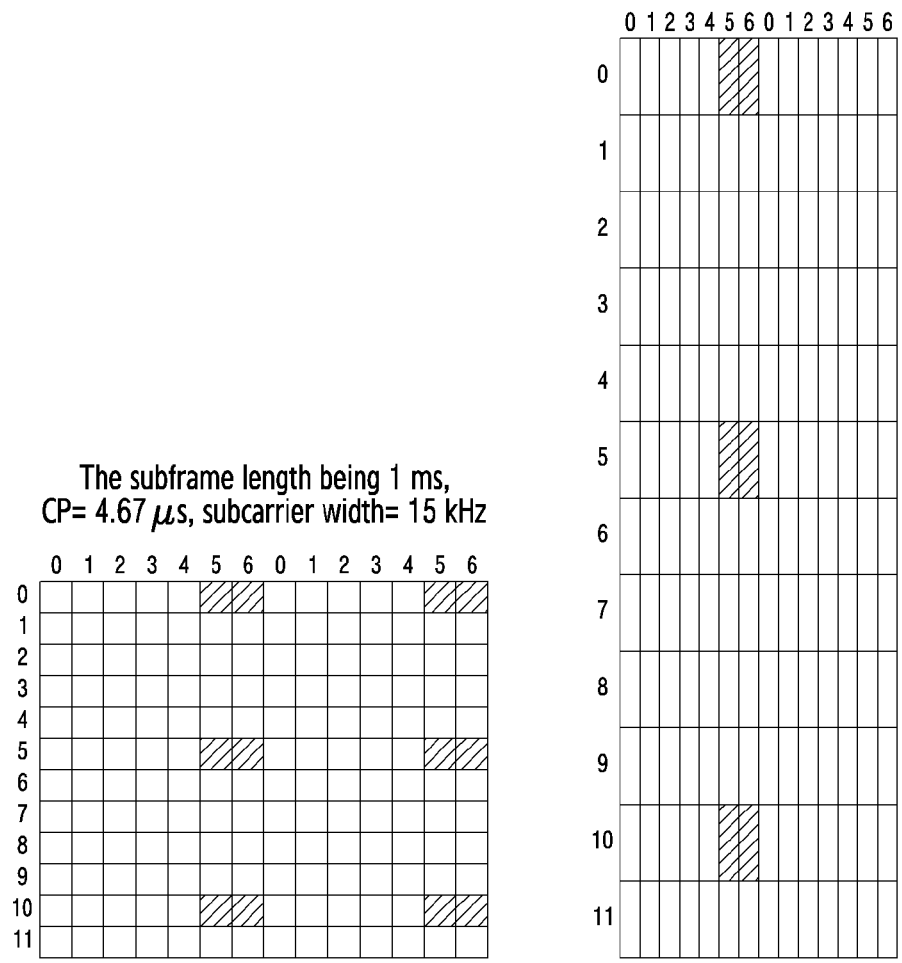

[Fig. 16]
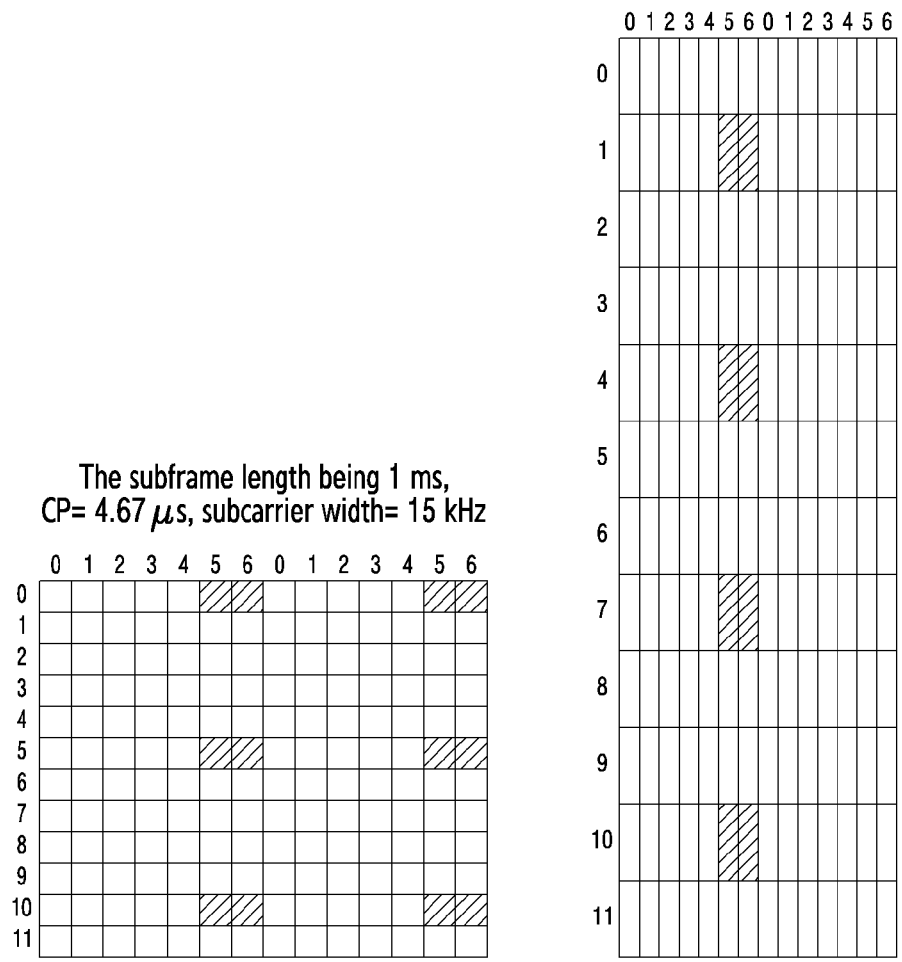

[Fig. 17]
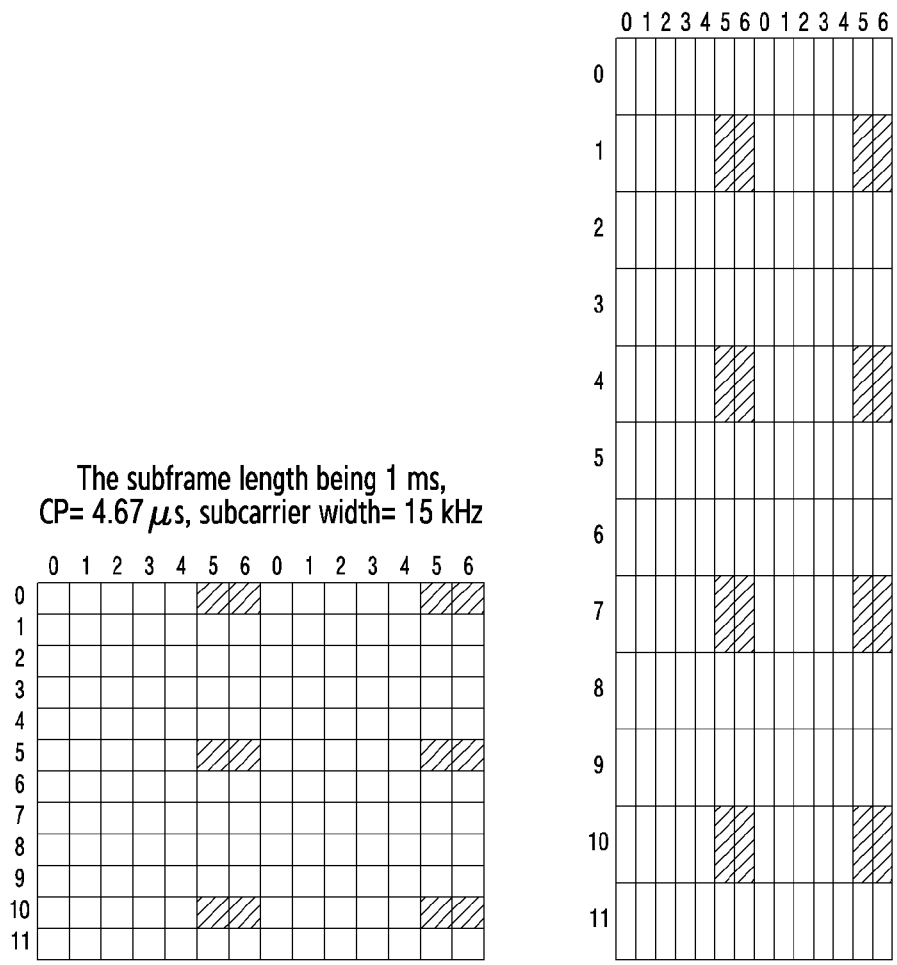

[Fig. 18]

Designing structure 1:
one row of DMRS in time-domain

Designing structure 2:
two rows of DMRS in time-domain

[Fig. 19]
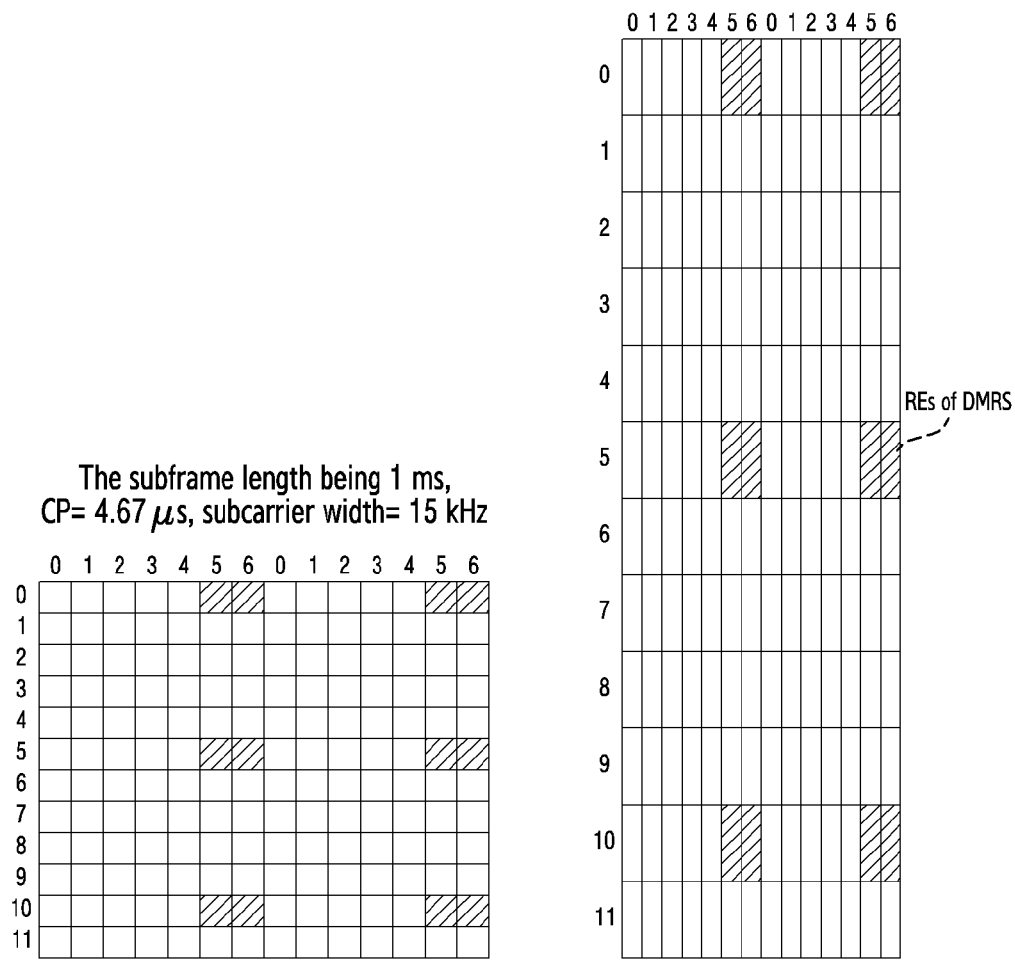

[Fig. 20]
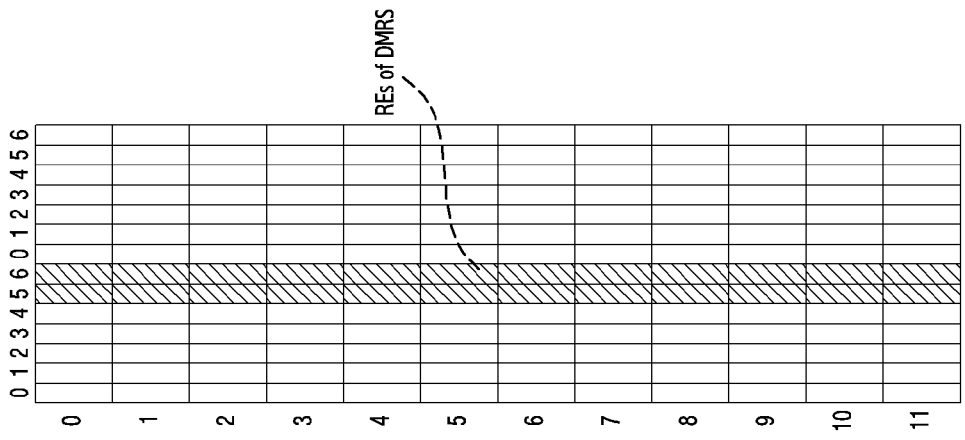
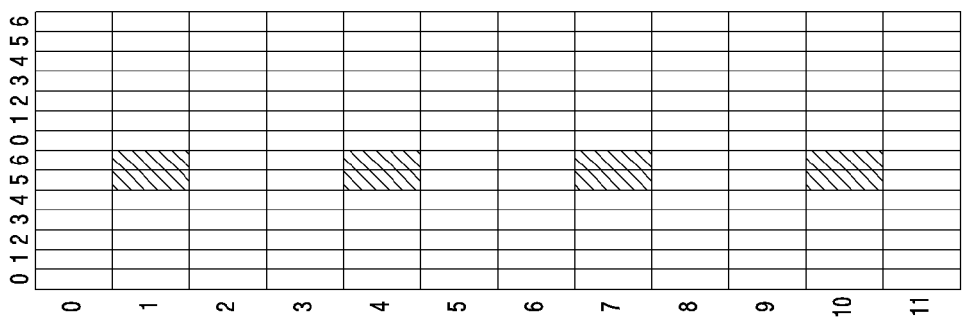
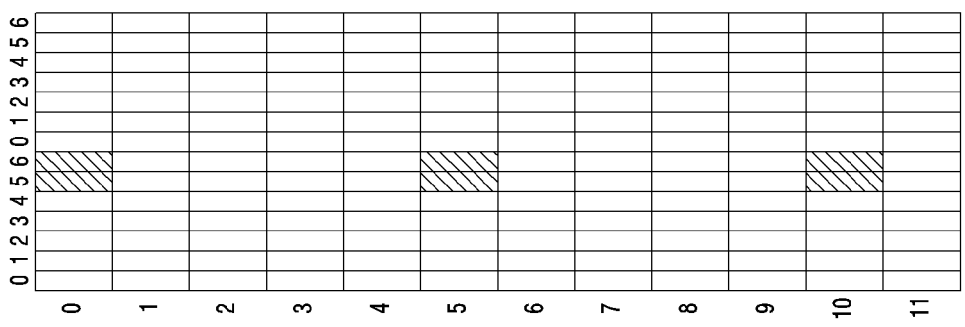

[Fig. 21]
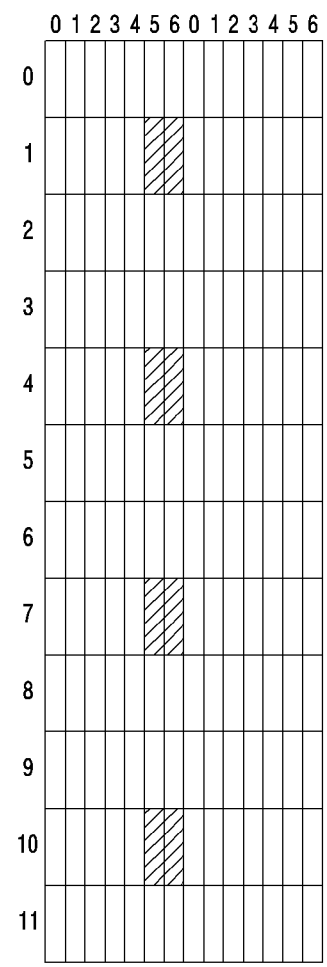
The subframe length being 0.5 ms,
CP= 4.67 μs, subcarrier width= 30 kHz
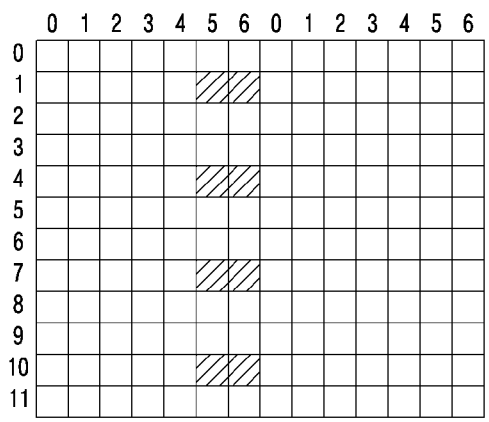
The subframe length being 1 ms,
CP= 4.67 μs, subcarrier width= 15 kHz

[Fig. 22]
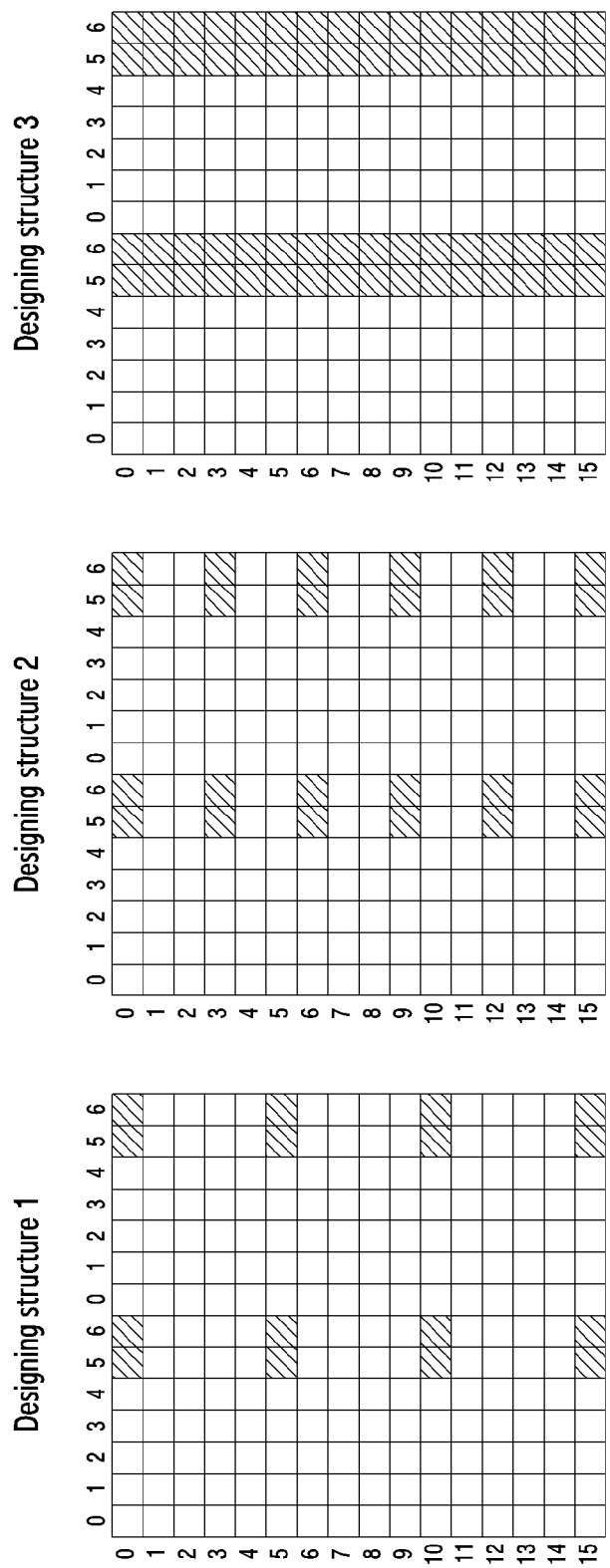

[Fig. 23]
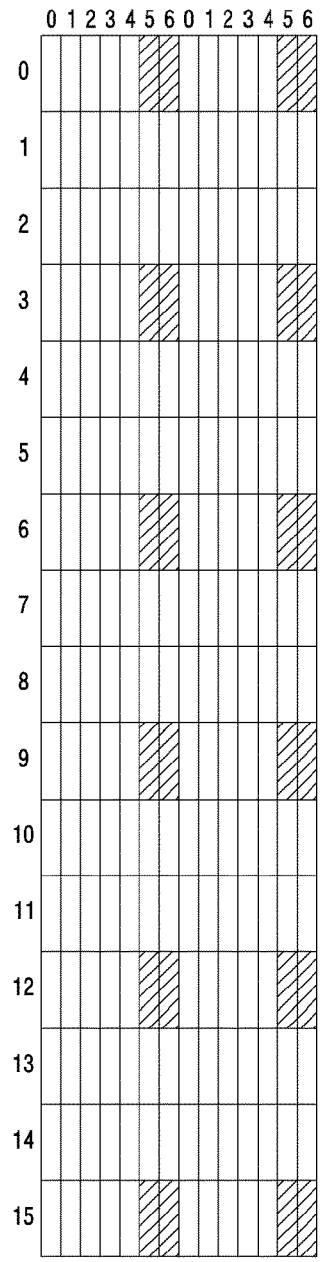
The subframe length being 0.5 ms, subcarrier width= 30 kHz
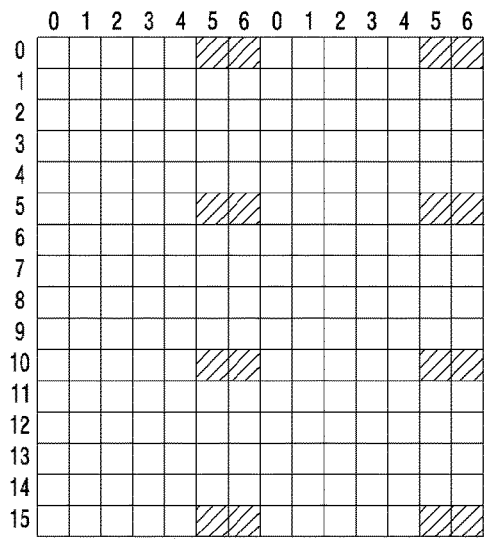
The subframe length being 1 ms, subcarrier width= 15 kHz
[Fig. 24]
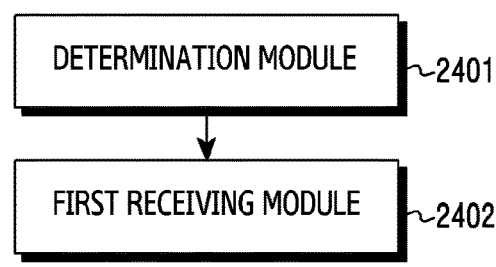

[Fig. 25]
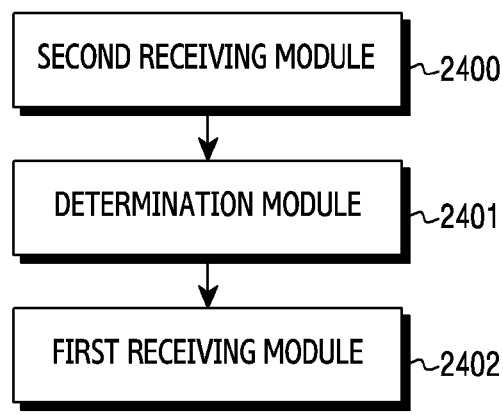

METHOD AND APPARATUS FOR RECEIVING DOWNLINK REFERENCE SIGNAL IN WIRELESS COMMUNICATION SYSTEM

CROSS-REFERENCE TO RELATED APPLICATIONS

This application is a 371 National Stage of International Application No. PCT/KR2017/010708, filed Sep. 27, 2017, which claims priority to Chinese Patent Application No. 201610857538.3, filed Sep. 27, 2016, and Chinese Patent Application No. 201610867885.4 filed Sep. 29, 2016, the disclosures of which are herein incorporated by reference in their entirety.

BACKGROUND

1. Field

The present disclosure generally relates to a wireless communication, and in particular to a method and apparatus for receiving downlink reference signal in the wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A reference signal is not for delivering any specific information. The purpose of this reference signal is to deliver the reference point for the downlink power. Another important role of reference signal is to help the receiver demodulate the received signal. Since the reference signal is made up of data known to both transmitter and receiver, the receiver can figure out how the communication channel distort the data by comparing the decoded received reference signal and predefined reference signal, and use the result of this comparison to equalize (post process) the received user data. The process for the receiver to perform this comparison and figure out the characteristics of a communication channel is called 'channel estimation' which is one of the most critical part of LTE. These reference signal are carried by multiples of specific resource elements in each slots and the location of the resource elements are specifically determined by antenna configuration.

SUMMARY

In physical resources with orthogonal frequency division multiplexing (OFDM) symbols having different characteristic, such as differences of cyclic prefix (CP), differences of carrier frequency, differences of subcarrier width and so on, and in the premises of the demodulation performance requirement being achieved, since the transmitted downlink reference signal occupies more resources, resources cannot be taken full advantage of.

According to various embodiments of the present disclosure, a method for operating a terminal in a wireless communication system, the method comprises determining a time-frequency structure of a downlink reference signal, and receiving, from a base station, the downlink reference signal according to the time-frequency structure.

According to various embodiments of the present disclosure, an apparatus for a terminal in a wireless communication system comprises a transceiver configured to transmit and receive signals and at least one processor. The at least one processor determines a time-frequency structure of a downlink reference signal of a transmitted data, and controls to the transceiver to receive the downlink reference signal according to the time-frequency structure.

Various embodiments of the present disclosure provide apparatus and method for receiving downlink reference signal efficiently in wireless communication systems.

The additional aspects and advantages of the invention will be provided in the description below in part, and it will be apparent from the following description, or be learned from the practice of the present disclosure.

BRIEF DESCRIPTION OF THE DRAWINGS

The above and/or additional aspects and advantages of the present disclosure will be apparent and easily comprehensible from the following description for the embodiments in accompanied with the figures, wherein, FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is a schematic diagram of a frame structure of time division duplex (TDD) system of long term evolution (LTE);

FIG. 6 is a schematic diagram of resources of orthogonal frequency division multiplexing (OFDM) symbols with subcarriers width being 15 kHz and 30 kHz in one carrier;

FIG. 7 is a schematic diagram of a configuration of antenna ports 7 and 8 of demodulation reference signal (DMRS);

FIG. 8 is a schematic diagram of the structure of OFDM symbols with subcarrier width and subframe length both being different;

FIG. 9 is a schematic diagram of a first change relationship of cyclic prefix (CP) length with subcarrier width of OFDM;

FIG. 10 is a schematic diagram of a second change relationship of CP length with subcarrier width of OFDM;

FIG. 11A is a schematic flowchart of a method for receiving downlink reference signal in a wireless communication system according to various embodiments of the present disclosure;

FIG. 11B is another schematic flowchart of a method for receiving downlink reference signal in a wireless communication system according to various embodiments of the present disclosure;

FIG. 12 is a schematic flowchart of a method for transmitting downlink reference signal in a wireless communication system according to various embodiments of the present disclosure;

FIG. 13 is a schematic diagram of designing the configuration of DMRS in a wireless communication system according to various embodiments of the present disclosure;

FIG. 14 is a schematic diagram of designing the configuration of DMRS in a wireless communication system according to various embodiments of the present disclosure;

FIG. 15 is a schematic diagram of designing the configuration of DMRS in a wireless communication system according to various embodiments of the present disclosure;

FIG. 16 is a schematic diagram of designing the configuration of DMRS in a wireless communication system according to various embodiments of the present disclosure;

FIG. 17 is a schematic diagram of designing the configuration of DMRS in a wireless communication system according to various embodiments of the present disclosure;

FIG. 18 is a schematic diagram of the structure of DMRS in the time-domain in a wireless communication system according to various embodiments of the present disclosure;

FIG. 19 is another schematic diagram of the structure of DMRS in the time-domain in a wireless communication system according to various embodiments of the present disclosure;

FIG. 20 is a schematic diagram of the structure of DMRS in the frequency-domain in a wireless communication system according to various embodiments of the present disclosure;

FIG. 21 is a schematic diagram of the structure of DMRS in the frequency-domain in a wireless communication system according to various embodiments of the present disclosure;

FIG. 22 is a schematic diagram of the structure of DMRS in the frequency-domain in a wireless communication system according to various embodiments of the present disclosure;

FIG. 23 is a schematic diagram of the structure of DMRS in the frequency-domain in a wireless communication system according to various embodiments of the present disclosure;

FIG. 24 is a block diagram of the apparatus for receiving downlink reference signal in a wireless communication system according to various embodiments of the present disclosure;

FIG. 25 is another block diagram of the apparatus for receiving downlink reference signal in a wireless communication system according to various embodiments of the present disclosure.

DETAILED DESCRIPTION

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted as having the meanings equal to the contextual meanings in the relevant field of art, and are not to be interpreted as having ideal or excessively formal meanings unless clearly defined in the present disclosure. In some cases, even terms defined in the present disclosure should not be interpreted as excluding embodiments of the present disclosure.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for receiving downlink reference signal in a wireless communication system.

Terms used in the following descriptions, such as a term referring to variables that determine time-frequency structure of the downlink reference signal, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It can be understood by those skilled in the art, unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

What need to be illustrated is that the present disclosure provides a method for receiving downlink reference signal, in other words, the method for receiving downlink reference signal can be achieved, by being programed, as a manner of computer program being realized in the related devices of user equipment (UE), provided the method is described in the view of UE.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may synthesize the influencing factors, and determine, according to different conditions, the designing methods of demodulation reference signal (DMRS) in time-domain and frequency-domain. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may includes a determination module. Here, the determination module may be a command/code temporarily resided in the controller 330, a storage space that stores the command/code, or a part of circuitry of the controller 330.

According to exemplary embodiments of the present disclosure, the controller 330 may determine time-frequency structure of a downlink reference signal of transmitted data and determine the method for receiving downlink reference signal corresponding to the higher layer signaling indication. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

The wireless communication system according to various embodiments of the present disclosure can support two duplex manners, specifically, frequency division duplex (FDD) and time division duplex (TDD). The transmission of long term evolution (LTE) comprises a transmission from base station (eNB) to user equipment (UE) (denoted as downlink) and a transmission from UE to base station (denoted as uplink). For TDD system, the uplink and downlink are transmitted on the same carrier at different times; while, for FDD system, the uplink and downlink are transmitted on different carries respectively.

FIG. 5 is a schematic diagram of a frame structure of TDD system of LTE. Wherein, the length of each radio frame is 10 ms, which is divided into two half-frames of length being 5 ms, wherein, each half-frame comprises eight time slots of length being 0.5 ms and three special fields of length being 1 ms. The three special fields respectively are downlink pilot time slot (DwPTS), guard period (GP) and uplink pilot time slot (UpPTS). And more, each subframe is composed of two continuous time slots.

Based on the frame structure of FIG. 5, within each 10 ms, the uplink and the downlink share ten subframes, and each subframe is configured to uplink or is configured to downlink, wherein, the subframe configured to the uplink is called as uplink frame, and the subframe configured to the downlink is called as downlink subframe. Seven type of uplink or downlink configuration is supported in the TDD system, as shown in the FIG. 5, wherein, D denotes downlink subframe, U denotes uplink subframe, and S denotes a special subframe comprising the above three special fields. Each subframe comprises fourteen OFDM symbols, the width of subcarrier is 15 kHz, each physical resource block (PRB) comprises twelve subcarriers, the frequency field width of each PRB is 180 kHz.

TABLE 1

Uplink or Downlink Configuration of TDD

| Config-uration number | Transition point period | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

The downlink data is transmitted through physical downlink shared channel (PDSCH), wherein, hybrid automatic retransmission request-acknowledgement (HARQ) information of the PDSCH can be transmitted on physical uplink shared channel (PUSCH) or physical uplink control channel (PUCCH). The uplink data is transmitted through PUSCH. PDSCH and PUSCH are scheduled by physical downlink control channel or enhanced physical downlink control channel (PDCCH/EPDCCH).

When demodulating PDSCH data, it can use demodulation reference signal (DMRS) to perform channel estimation, specifically, as shown in FIG. 7, which is a schematic diagram of configurations of antenna ports 7 and 8 of DMRS.

Due to the differences of carrier frequency used by UEs for transmitting data, differences of movement speed of UEs, differences of size of cells, and differences of service delay and reliability requirement, subcarrier width used for transmitting data may be different, cyclic prefix (CP) length of OFDM symbol for transmitting data may be different. The differences of subcarrier width or CP length of OFDM symbol of physical resources are collectively called as difference of numerology, for example, as shown in FIG. 6, which is a schematic diagram of resources of OFDM symbols with subcarriers widths being 15 kHz and 30 kHz respectively in a carrier. Herein, the subcarrier width may be referred as 'subcarrier spacing' or 'subcarrier space'. Besides, due to differences of subcarrier widths of OFDM symbol, the length of subframes may be different either. As shown in FIG. 8, when the subcarrier width of an OFDM symbol is 15 kHz, the subframe length is 1 ms; when the subcarrier width of an OFDM symbol is 30 kHz, the subframe length is 0.5 ms, and the number of OFDM symbols are the same in each subframe, i.e., fourteen. Herein, the subframe may be referred as a 'slot'. The CP length and the subcarrier width of OFDM symbol are changed into inverse proportion, in other words, when the subcarrier width of an OFDM symbol is 15 kHz, the CP length is 4.67 µs, when the subcarrier width of an OFDM symbol is 30 kHz, the CP length is 2.34 µs, at this time, the overhead of CP is unchanged, in other words, the proportion of the time-frequency resource for transmitting CP and the time-frequency resource for transmitting data is unchanged. As shown in FIG. 9, wherein, the overhead of CP indicates a ratio of CP length to the length of OFDM symbol. Or, when the subcarrier width of an OFDM symbol is changed, the CP length is unchanged, that is, when the subcarrier width of an OFDM symbol is 15 kHz, the CP length is 4.67 µs, when the subcarrier width of OFDM symbol is 30 kHz, the CP length is 4.67 µs, at this moment, the overhead of CP is increased, as shown in FIG. 10.

Wherein, the UE receives the downlink reference signal through determining the time-frequency structure of downlink reference signal of the transmitted data by the UE and further according to the time-frequency structure. In other words, the present scheme can determine the time-frequency structure of the downlink reference signal to receive the downlink reference signal, so as to take full advantage of the downlink reference signal to optimize the resources.

FIG. 11A is a schematic flowchart of a method for receiving downlink reference signal in a wireless communication system according to various embodiments of the present disclosure. To make the objectives, technical scheme and advantages of the present application clearer, the present disclosure will be illustrated in details further, with reference to accompanying drawings and embodiments. Specifically, the method comprises the following steps.

Referring FIG. 11A, in Step 1101, the UE determines the time-frequency structure of downlink reference signal of the transmitted data. Specifically, the time-frequency structure of the downlink reference signal comprises the resource element (RE) number occupied by the downlink reference signal in time-domain in each subframe, and the position occupied by the downlink reference signal in time-domain. The time-frequency structure of the downlink reference signal further comprises the RE number occupied by the downlink reference signal in frequency-domain in each subframe, and the position occupied by the downlink reference signal in frequency-domain. In step 1102, according to the time-frequency structure, the UE receives the downlink reference signal.

Further, in another embodiment of the present disclosure, before the step 1101, the method further comprises step 1100, as shown in the FIG. 11B. In step 1100, according to the higher layer signaling indication received from the base station, the UE determines the method for receiving downlink reference signal corresponding to the higher layer signaling indication.

FIG. 12 is a schematic flowchart of a method for transmitting downlink reference signal in a wireless communication system according to various embodiments of the present disclosure. To make the objectives, technical scheme and advantages of the present application clearer, the present disclosure will be illustrated in details further, with reference to accompanying drawings and embodiments. Specifically, the method comprises the following steps.

Referring FIG. 12 in Step 1201, the base station determines the time-frequency structure of downlink reference signal of the transmitting data. Specifically, the time-frequency structure of the downlink reference signal comprises the resource element (RE) number occupied by the downlink reference signal in time-domain in each subframe, and the position occupied by the downlink reference signal in time-domain. The time-frequency structure of the downlink reference signal further comprises the RE number occupied by the downlink reference signal in frequency-domain in each subframe, and the position occupied by the downlink reference signal in frequency-domain. In step 1202, according to the time-frequency structure, the base transmits the downlink reference signal.

Further, in another embodiment of the present disclosure, before the step 1201, the method further comprises step 1200. In step 1200, the base station transmits higher layer signaling indication which indicates method for transmitting downlink reference signal.

The DMRS in the invention is one type of the downlink reference signals, the following description will take DMRS as an example, while, the method in the present disclosure can also be applied to other downlink references signals.

For easy to understand the concrete implements of the scheme of the invention, the scheme of the invention will be described in details accompanying with the specific embodiments below.

Embodiment 1

Specifically, the invention designs a scheme of DMRS according to specific application scenarios, on basis of this scheme, then according to the preset physical features of the transmitted data, changes the frequency-domain density and time-domain density of the DMRS, to determine the time-frequency structure of the DMRS. Wherein, the preset physical features of the transmitted data comprise at least one of the following: the subframe length; the subcarrier width of OFDM; the CP length; the size of carrier frequency; the service type of the transmitted data and the movement speed of UE. Further, the frequency-domain density of DMRS denotes the frequency interval between adjacent REs of DMRSs in frequency-domain, and the time-domain density denotes the time interval between adjacent REs of DMRSs in time-domain.

Specifically, in one application scenario of one embodiment of the scheme, according to a condition when the subframe length being 1 ms and each subframe having fourteen OFDM symbols, subcarrier width of which being 15 kHz, a DMRS scheme is designed. Because of the subframe length of existing LTE being 1 ms and each subframe having fourteen OFDM symbols, subcarrier width of which being 15 kHz, the parameters of existing LTE are same with above parameters, thus the scheme of DMRS can use a scheme which is same with DMRS scheme of LTE, as shown in FIG. 7; alternatively, according to requirements, the DMRS is put in the foremost OFDM symbols of the subframe, so as to reduce the delay of data processing as far as possible.

Some methods of designing DMRS in this embodiment are described below.

Designing Method 1:

In an application scenario of the scheme, when the carrier frequency of the transmitted data increases by a large extent, for example, when the data is transmitted at millimeter wave, since the data is transmitted mainly by perpendicular incidence or reflecting at millimeter wave, the delay spread is much decreased, so that the frequency selectivity is reduced, and the frequency-domain density of DMRS can be reduced. Because of wave length of millimeter wave being very short, then the Doppler is increased, thus, the time selectivity is improved, the time-domain density of DMRS is needed to be improved. Since frequency offset error and phase noise in millimeter wave have a heavy influence on the demodulation performance, increasing the width of OFDM subcarrier can against the influence of frequency offset error and phase noise in millimeter wave on the demodulation performance. When the subframe length is in inverse proportion with the subcarrier width, then CP length is in inverse proportion with the subcarrier width. It is assumed that the subcarrier changes from $\Delta f1$ to $\Delta f1 \cdot 2$ m, then the length of subframe changes from 1 to 1/2 m, and then the CP length changes from cp to cp/2 m. For example, in the condition of high carrier frequency, an OFDM, of which the subcarrier width is 30 kHz, the subframe length is 0.5 ms and the CP length is 2.34 μs, wherein, each subframe comprising fourteen OFDM symbols, is introduced, as shown in FIG. 13.

Further, since the CP length becomes smaller, then frequency selectivity of channel is decreased, so as to reduce the frequency-domain density of DMRS, that is, to increase the frequency interval between adjacent REs of DMRSs in frequency-domain. Since the subcarrier width of OFDM symbols increases, if the REs number between adjacent REs of DMRSs in frequency-domain maintains unchanged, then the frequency interval between adjacent REs of DMRSs in frequency-domain is increased. As shown in FIG. 14, for example, in the condition of high carrier frequency, the subcarrier width of the introduced OFDM is 30 kHz, which is doubled; the length of subframe is 0.5 ms, which is reduced by half; the length of CP is 2.34 μs, which is reduced by half; each subframe comprising fourteen OFDM symbols and maintaining the REs number between adjacent REs of DMRSs in frequency-domain unchanged, then the frequency interval between adjacent REs of DMRSs in frequency-domain is doubled. The REs number between adjacent REs of DMRSs in frequency-domain will change with the change of CP overhead. If the CP overhead is unchanged, the REs number between adjacent REs of DMRSs in frequency-domain maintains unchanged, for example, with the increasing of CP overhead, the REs number between adjacent REs of DMRSs in frequency-domain decreases, in other words, with the increasing of CP overhead, the frequency selectivity of channel enhances, further the DMRS frequency-domain density increases.

Further, because of the increasing of carrier frequency and decreasing of wave length, the time selectivity of channel is increased. It needs to improve the time-domain density of DMRS, in other words, to decrease the time interval between adjacent REs of DMRSs in time-domain. Since the duration time of each OFDM symbol is decreased, if the REs number between adjacent REs of DMRSs in time-domain maintains unchanged, the time interval between adjacent REs of DMRSs in time-domain is decreased. As shown in FIG. 14, for example, in the condition of high carrier frequency, the subcarrier width of the introduced OFDM is 30 kHz, which is doubled; the subframe length is 0.5 ms, which is reduced by half; the CP length is 2.34 µs, which is reduced by half; each subframe comprises fourteen OFDM symbols and the REs number between adjacent REs of DMRSs in time-domain maintained unchanged, then the time interval between adjacent REs of DMRSs in time-domain is doubled.

Designing Method 2:

In an application scenario of the scheme, when the carrier frequency for transmitting data increases by a large extent, for example, when the data is transmitted at millimeter wave, since the data is transmitted mainly by perpendicular incidence or reflecting at millimeter wave, the delay spread is much decreased, so that the frequency selectivity is reduced, and the frequency-domain density of DMRS can be reduced. Because of wave length of millimeter wave being very short, then the Doppler is increased, thus, the time selectivity is improved, the time-domain density of DMRS is needed to improve. Since frequency offset error and phase noise at millimeter wave have a heavy influence on the demodulation performance, increasing the subcarrier width of OFDM symbol can against the influence of frequency offset error and phase noise at millimeter wave on the demodulation performance. When the subframe length is in inverse proportion with the subcarrier width, then CP length is in inverse proportion with the subcarrier width. It is assumed that the subcarrier width changes from $\Delta f1$ to $\Delta f1 \cdot 2$ m, then the subframe length changes from 1 to 1/2 m, then the CP length changes from cp to cp/2 m. For example, in the condition of high carrier frequency, an OFDM, of which the subcarrier width is 30 kHz, the subframe length is 0.5 ms and the CP length is 2.34 µs, wherein, each subframe comprises fourteen OFDM symbols, is introduced, which is changed into that as shown in FIG. 13.

Further, since the CP length becomes smaller, then frequency selectivity of channel is decreased, so as to reduce the frequency-domain density of DMRS, that is, to increase the frequency interval between adjacent REs of DMRSs in frequency-domain. Since the subcarrier width of OFDM symbols increases, if the REs number between adjacent REs of DMRSs in frequency-domain maintains unchanged, then the frequency interval between adjacent REs of DMRSs in frequency-domain is increased. As shown in FIG. 15, for example, in the condition of high carrier frequency, the subcarrier width of the introduced OFDM is 30 kHz, which is doubled; the subframe length is 0.5 ms, which is reduced by half; the CP length is 2.34 µs, which is reduced by half; each subframe comprises fourteen OFDM symbols and the REs number between adjacent REs of DMRSs in frequency-domain is maintained unchanged, then the frequency interval between adjacent REs of DMRSs in frequency-domain is doubled.

Further, because of the increasing of carrier frequency and decreasing of wave length, the time selectivity of channel may be increased; since the movement speed of UE decreases, the time selectivity of channel may be decreased, for the influences of the above two factors, it is no need to improve the time-domain density of DMRS, that is, the time interval between adjacent REs of DMRSs in time-domain should be maintained. Since the duration time of each OFDM symbol is decreased, if the time interval between adjacent REs of DMRSs in time-domain maintains unchanged, the REs number between adjacent REs of DMRSs in time-domain is increased. As shown in FIG. 15, for example, in the condition of high carrier frequency, the subcarrier width of the introduced OFDM is 30 kHz, which is doubled; the subframe length is 0.5 ms, which is reduced by half; the CP length is 2.34 µs, which is reduced by half; each subframe comprises fourteen OFDM symbols, wherein, the duration time of each OFDM symbol reduces by half, and maintaining the REs number between adjacent REs of DMRSs in frequency-domain double, then the time interval between adjacent REs of DMRSs in time-domain will be unchanged.

Designing Method 3:

In an application scenario of the scheme, when the coverage area for servicing cells reduces by a large extent and radius of cells decrease, the frequency selectivity is reduced, resulting in reducing the frequency-domain density of DMRS. Since the carrier frequency is unchanged, the time selectivity is unchanged, so that the time-domain density is maintained. Because of the requirement of low delay service, the increasing of width of OFDM subcarrier can reduce the length of OFDM symbol. When the length of subframe changes in inverse proportion with the change of width of subcarrier, then length of CP changes in inverse proportion with the change of width of subcarrier. It is assumed that the width of subcarrier changes from $\Delta f1$ to $\Delta 1 \cdot 2$ m, then the length of subframe changes from 1 to 1/2 m, then the length of CP changes from cp to cp/2 m. For example, an OFDM, of which the width of subcarrier is 30 kHz, the length of subframe is 0.5 ms and the length of CP is 2.34 ms, wherein, each subframe comprises fourteen OFDM symbols, is introduced, which is changed into that as shown in FIG. 13.

Further, since the length of CP becomes smaller, then frequency selectivity of channel is decreased, so as to reduce the frequency-domain density of DMRS, that is, to increase the frequency interval between adjacent REs of DMRSs in frequency-domain. Since the width of subcarrier of OFDM symbols increases, if the REs number between adjacent REs of DMRSs in frequency-domain maintains unchanged, then the frequency interval between adjacent REs of DMRSs in frequency-domain is increased. As shown in FIG. 15, for example, in the condition of high carrier frequency, the width of subcarrier of the introduced OFDM is 30 kHz, which is doubled; the length of subframe is 0.5 ms, which is reduced by half; the length of CP is 2.34 µs, which is reduced by half; each subframe comprises fourteen OFDM symbols and the REs number between adjacent REs of DMRSs in frequency-domain is maintained unchanged, then the frequency interval between adjacent REs of DMRSs in frequency-domain is doubled.

Further, because of carrier frequency being unchanged, the time selectivity of channel is unchanged. It needs to improve the time-domain density of DMRS, in other words, the time interval between adjacent REs of DMRSs in time-domain should be maintained. Since the duration time of each OFDM symbol is decreased, if the time interval between adjacent REs of DMRSs in time-domain maintains unchanged, the REs number between adjacent REs of DMRSs in time-domain is increased. As shown in FIG. 15, for example, the width of subcarrier of the introduced OFDM is 30 kHz, which is doubled; the length of subframe is 0.5 ms, which is reduced by half; the length of CP is 2.34 µs, which is reduced by half; each subframe comprises fourteen OFDM symbols, the duration time of each OFDM symbol reduces by half and maintaining the REs number between adjacent REs of DMRSs in frequency-domain double, then the time interval between adjacent REs of DMRSs in time-domain will be unchanged.

Designing Method 4:

In an application scenario of the scheme, when the coverage area for servicing cells is unchanged, radius of cells is unchanged, and the frequency selectivity is unchanged, thus, the frequency selectivity is unchanged, resulting in the frequency-domain density of DMRS being maintained. Since the carrier frequency is unchanged, the time selectivity is unchanged, so that the time-domain density is maintained. Because of the requirement of low delay service, the increasing of width of OFDM subcarrier can reduce the length of OFDM symbol. When the length of subframe changes in inverse proportion with the change of width of subcarrier, since the delay spread is unchanged, the length of CP is unchanged, it is assumed that the width of subcarrier changes from $\Delta f1$ to $\Delta 1 \cdot 2$ m, then the length of subframe changes from 1 to 1/2 m, then the length of CP changes is unchanged. For example, an OFDM, of which the width of subcarrier is 30 kHz, the length of subframe is 0.5 ms and the length of CP is 4.67 µs, is introduced.

Further, since the length of CP maintains unchanged, then frequency selectivity of channel is unchanged, so as to maintain the frequency-domain density of DMRS, that is, to maintain the frequency interval between adjacent REs of DMRSs in frequency-domain. Since the width of subcarrier of OFDM symbols increases, if the frequency interval between adjacent REs of DMRSs in frequency-domain maintains unchanged, then the REs number between adjacent REs of DMRSs in frequency-domain is decreased. In other words, in the condition of same number of subcarrier, the RE number of DMRS in frequency is increased. As shown in FIG. 16, for example, the width of subcarrier of the introduced OFDM is 30 kHz, which is doubled; the length of subframe is 0.5 ms, which is reduced by half; the length of CP is 4.67 µs, which is unchanged; the frequency interval between adjacent REs of DMRSs in frequency-domain is maintained unchanged, then the REs number between adjacent REs of DMRSs in frequency-domain will be reduced by half.

Further, because of carrier frequency being unchanged, the time selectivity of channel is unchanged. It needs to improve the time-domain density of DMRS, in other words, the time interval between adjacent REs of DMRSs in time-domain should be maintained. Since the duration time of each OFDM symbol is decreased, if the time interval between adjacent REs of DMRSs in time-domain maintains unchanged, the REs number between REs of DMRSs in adjacent time-domain is increased. As shown in FIG. 16, for example, the width of subcarrier of the introduced OFDM is 30 kHz, which is doubled; the length of subframe is 0.5 ms, which is reduced by half; the length of CP is 4.67 µs, which is unchanged; the time interval between adjacent REs of DMRSs in time-domain is maintained unchanged.

Designing Method 5:

In an application scenario of the scheme, when the coverage area for servicing cells is unchanged, radius of cells is unchanged, and the frequency selectivity is unchanged, thus, the frequency selectivity is unchanged, resulting in the frequency-domain density of DMRS being maintained. Since the carrier frequency is unchanged, the time selectivity is unchanged, so that the time-domain density of DMRS is maintained. Because of the requirement of low delay service, the increasing of width of OFDM subcarrier can reduce the length of OFDM symbol. When the length of subframe changes in inverse proportion with the change of width of subcarrier, since the delay spread is unchanged, the length of CP is unchanged, it is assumed that the width of subcarrier changes from $\Delta f1$ to $\Delta 1 \cdot 2$ m, then the length of subframe changes from 1 to 1/2 m, then the length of CP is unchanged. For example, an OFDM, of which the width of subcarrier is 30 kHz, the length of subframe is 0.5 ms and the length of CP is 4.67 µs, is introduced.

Further, since the length of CP maintains unchanged, then frequency selectivity of channel is unchanged, so as to maintain the frequency-domain density of DMRS, that is, to maintain the frequency interval between adjacent REs of DMRSs in frequency-domain. Since the width of subcarrier of OFDM symbols increases, if the frequency interval between adjacent REs of DMRSs in frequency-domain maintains unchanged, then the REs number between adjacent REs of DMRSs in frequency-domain is decreased. In other words, in the condition of same number of subcarrier, the RE number of DMRS in frequency-domain is increased. As shown in FIG. 17, for example, the width of subcarrier of the introduced OFDM is 30 kHz, which is doubled; the length of subframe is 0.5 ms, which is reduced by half; the length of CP is 4.67 µs, which is unchanged; the frequency interval between adjacent REs of DMRSs in frequency-domain is maintained unchanged, then the REs number between adjacent REs of DMRSs in frequency-domain is reduced.

Further, because of carrier frequency being unchanged, while, the movement speed of UE is improved and the time selectivity of channel is increased, it needs to improve the time-domain density of DMRS, in other words, the time interval between adjacent REs of DMRSs in time-domain should be decreased. Since the duration time of each OFDM symbol is decreased, if the time interval between adjacent REs of DMRSs in time-domain maintains is decreased, the REs number between adjacent REs of DMRSs in time-domain is maintained unchanged. As shown in FIG. 17, for example, the width of subcarrier of the introduced OFDM is 30 kHz, which is doubled; the length of subframe is 0.5 ms, which is reduced by half; the length of CP is 4.67 µs, which is unchanged; the REs number between adjacent REs of DMRSs in time-domain is maintained unchanged.

In summary, the above five designing methods of DMRS is determined according to the preset physical features of transmitted data, such as, the subframe length, the subcarrier width of the used OFDM, the CP length, the size of carrier, the service type of transmission and the movement speed of UE. When the subcarrier width or the CP length of OFDM change, because there are many influencing factors and functions of certain factors are conflicting, therefore, the base station can synthesize the influencing factors, and determine one of the designing method from designing method 1, designing method 2, designing method 3, designing method 4 and designing method 5 as the designing method of DMRS. The UE can determine, through receiving higher layer signaling indication, one of the designing method 1, designing method 2, designing method 3, designing method 4 and designing method 5 to receive DMRS, and then perform channel estimation.

For the configuration of time-frequency structure of DMRS, frequency-domain density and time-domain density can be determined according to the number of resource elements, which is unrelated to the time-domain length of OFDM symbol and the subcarrier width of OFDM symbol. For example, in the FIG. 14, the configuration of the time-frequency structure of DMRS in left picture and the configuration of the time-frequency structure of DMRS in the right picture can be regarded as the same configuration, in spite of the width of OFDM subcarrier in the left picture being 15 kHz, the width of OFDM subcarrier in the right picture being 30 kHz, and the length of time-domain of OFDM in the left picture being as twice as that in the right picture.

Embodiment 2

In one embodiment of the scheme, the base station can determine, according to different conditions, the designing methods of DMRS in time-domain and frequency-domain, and UE can determine, through receiving the higher layer signaling indication from the base station, one of the above the designing methods of DMRS in time-domain and frequency-domain to receive DMRS, then the UE can perform channel estimation.

Specifically, for the requirement of time-domain density of DMRS, resources of DMRS must be included within each subframe, that is, when the length of subframe is shorten further, to ensure that resources of DMRS must be included within each subframe, the time-domain density of DMRS cannot be decreased further. For example, when the subframe length is 0.5 ms, DMRS in each subframe in time-domain is not repeated, when the length of subframe is 0.25 ms, density of DMRS in each subframe in time-domain maintain unchanged. Or, several types of structure of DMRS in time-domain are designed, for example, structure 1 and structure 2 are designed as shown in FIG. 18, which is designed according to the REs number in time-domain, and is unrelated to the length of OFDM symbol; as shown in FIG. 19, the design in the left side and the design in the right side are the same type of time-domain designing structure.

Further, for the requirements of frequency-domain density of DMRS, resources of DMRS must be included within each physical resource block (PRB). At present, the alternative numbers of subcarriers are 12 and 16 in each PRB, and it need to further consider which one of 12 and 16 would be selected as the number of subcarriers in each PRB in frequency-domain. With the increasing of width of OFDM subcarrier, according to the change of frequency selectivity, several types of frequency-domain structure of DMRS can be designed, for example, when the number of subcarriers in each PRB is 12, the frequency-domain interval of DMRS in each PRB can be one or more of 4, 2 and 1. Such as, the designing structure 1, structure 2 and structure 3 are shown as FIG. 20, which is designed according to the REs number in the frequency-domain and unrelated with the subcarrier width of OFDM symbol, as shown in FIG. 21, the design on the left side and the design on the right side are the same type of frequency-domain designing structure. When the number of subcarriers in each PRB is 16, the frequency-domain interval of DMRS in each PRB can be one or more of 4, 2 and 1, such as, the designing structure 1, structure 2 and structure 3, as shown in FIG. 22, which is designed according to REs number in frequency-domain and unrelated with the subcarrier width of OFDM symbol; while, as shown in FIG. 23, the design on the left side and the design on the right side are the same frequency-domain structure designing.

For the time-frequency structure of DMRS for receiving common data (e.g., master information block (MIB), system information block (SIB) or paging information), the UE may not in connected mode, at this moment, the UE cannot receive higher layer signaling configuration information, and the time-frequency structure of DMRS can determine a default DMRS structure according to protocols; or the time-frequency structure of the DMRS can be indicated according to the information carried on the received synchronization signal; or the time-frequency structure of DMRS can be determined according to one or more factors of the subcarrier width of OFDM, the CP length, the CP overhead and the size of carrier frequency, which are acquired according to received synchronization signal, for example, as shown in Table 2, which is the mapping relationship between the time-frequency structure of DMRS for receiving common data, the subcarrier width of OFDM and the CP length.

TABLE 2 the mapping relationship between the time-frequency structure of DMRS, the CP length and the subcarrier width of OFDM

| the CP length | the subcarrier width of OFDM | the time-frequency structure of DMRS |
| --- | --- | --- |
| the CP length 1 | the subcarrier width 1 of OFDM | the time-frequency structure 1 of DMRS |
| the CP length 2 | the subcarrier width 2 of OFDM | the time-frequency structure 2 of DMRS |
| ... | ... | ... |
| the CP length N | the subcarrier width N of OFDM | the time-frequency structure N of DMRS |

For example, as shown in Table 3, the mapping relationship between the frequency-domain structure of DMRS for receiving common data and the CP overhead of OFDM.

TABLE 3 the mapping relationship of the frequency-domain structure between DMRS and the CP overhead of OFDM

| the CP overhead | the frequency-domain structure of DMRS |
| --- | --- |
| the CP overhead 1 | the frequency-domain structure 1 of DMRS |
| the CP overhead 2 | the frequency-domain structure 2 of DMRS |
| ... | ... |
| the CP overhead N | the frequency-domain structure N of DMRS |

For the time-frequency structure of DMRS for receiving the UE specific data, it can be determined according to the above method, or determined by the UE through receiving higher layer signaling configuration.

For the time-frequency structure of DMRS for receiving physical downlink control channel (PDCCH), it can be processed according to the following method. PDCCH can be divided into common search space and UE specific search space. For the DMRS of PDCCH for common search space and/or the time-frequency structure of DMRS of PDCCH for UE specific search space, the time-frequency structure of DMRS can determine a default DMRS structure according to protocols; or the time-frequency structure of the DMRS can be indicated according to the information carried on the received synchronization signal or system information; or the time-frequency structure of DMRS can be determined according to one or more factors of the subcarrier width of OFDM, the CP length, the CP overhead and the size of carrier frequency, which are acquired according to received synchronization signal.

Or, for the time-frequency structure of DMRS for UE specific search space PDCCH, which can be determined by UE according to the higher layer signaling configuration.

In summary, in one embodiment of the present disclosure, a method for receiving downlink reference signal is provided, which determines the time-frequency structure of downlink reference signal of the transmitted data by UE, and then, according to the time-frequency structure, the UE receives the downlink reference signal. In other words, the scheme can determine the time-frequency structure of downlink reference signal to receive the downlink reference signal, so as to take full advantages of the downlink reference signal and optimize the resources.

Further, according to the functional modularity thoughts of computer software, on basis of above method for receiving downlink reference signal, the invention further provides a device for receiving downlink reference signal, which can be a user equipment. Specifically, as shown in FIG. 24, the device comprises a determination module 2401 and a first receiving module 2402.

Wherein, the determination module 2401 is configured to determine time-frequency structure of a downlink reference signal of transmitted data by UE; the first receiving module 2402 is configured to, according to the time-frequency structure, receive the downlink reference signal by UE.

Further, in one embodiment of the scheme, the device for receiving downlink reference signal further comprises a second receiving module 2400, as shown in FIG. 25. Wherein, the second receiving module 2400 is configured to, before determining a time-frequency structure of a downlink reference signal of a transmitted data by the determination module 2401, according to a higher layer signaling indication received from a base station, determine a method for receiving downlink reference signal corresponding to the high signaling indication by UE.

In the scheme of present disclosure, the implements of specific function of each module in the device for receiving downlink reference signal can refer to the specific steps of above Step 1100, Step 1101, Step 1102, embodiment 1 and embodiment 2, and will not be repeated here.

The foregoing descriptions are merely some implementations of the present disclosure. It should be noted that, to a person of ordinary skill in the art, various improvements and modifications can be made without departing from the principle of the present disclosure, and these improvements and modifications shall be regarded as falling into the protection scope of the present disclosure.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for operating a terminal in a wireless communication system, the method comprising:
   receiving, from a base station, synchronization signals;
   identifying a first time-frequency structure of a first demodulation reference signal for a master information block (MIB) based on information carried on the synchronization signals;
   receiving, from the base station, the first demodulation reference signal for the MIB based on the first time-frequency structure;
   receiving, from the base station, configuration information for a second time-frequency structure of a second demodulation reference signal for physical downlink shared channel (PDSCH) by a higher layer signaling; and
   receiving, from the base station, the second demodulation reference signal for PDSCH based on the configuration information.

2. The method of claim 1, further comprising:
   obtaining a subcarrier spacing of a synchronization signal based on the synchronization signal; and
   determining a subcarrier spacing for the first time-frequency structure of the first demodulation reference signal as the obtained subcarrier spacing of the synchronization signal.

3. The method of claim 1, further comprising:
performing first channel estimation based on the received first demodulation reference signal;
obtaining the MIB based on a result of the first channel estimation;
performing second channel estimation based on the received second demodulation reference signal; and
obtaining data on the PDSCH based on a result of the second channel estimation.

4. The method of claim 1,
wherein, when a subcarrier spacing for each resource element (RE) of the second time-frequency structure of the second demodulation reference signal is changed, a frequency-domain density and a time-domain density are maintained and a length of cyclic prefix (CP) is changed,
wherein the frequency-domain density comprises frequency intervals between adjacent REs of downlink reference signals in a frequency-domain, and
wherein the time-domain density comprises time intervals between adjacent REs of downlink reference signals in a time-domain.

5. A method for operating a base station in a wireless communication system, the method comprising:
transmitting, to a terminal, synchronization signals;
transmitting, to the terminal, a first demodulation reference signal for a master information block (MIB) based on a first time-frequency structure, wherein the first time-frequency structure are identified based on information carried on the synchronization signals;
transmitting, to the terminal, configuration information for a second time-frequency structure of a second demodulation reference signal for physical downlink shared channel (PDSCH) by a higher layer signaling; and
transmitting, to the terminal, the second demodulation reference signal for PDSCH based on the configuration information.

6. The method of claim 5, further comprising:
configuring the first time-frequency structure of the first demodulation reference signal based on a subcarrier spacing of a synchronization signal.

7. The method of claim 5, further comprising:
transmitting the MIB with the first demodulation reference signal on a first channel; and
transmitting data on the PDSCH with the second demodulation reference signal on a second channel.

8. The method of claim 5,
wherein, when a subcarrier spacing for each resource element (RE) of the second time-frequency structure of the second demodulation reference signal is changed, a frequency-domain density and a time-domain density are maintained and a length of a cyclic prefix (CP) is changed,
wherein the frequency-domain density comprises frequency intervals between adjacent REs of downlink reference signals in a frequency-domain, and
wherein the time-domain density comprises time intervals between adjacent REs of downlink reference signals in a time-domain.

9. A terminal in a wireless communication system, the terminal comprising:
at least one transceiver; and
at least one processor operably coupled to the at least one transceiver, and configured to:
receive, from a base station, synchronization signals;
identify a first time-frequency structure of a first demodulation reference signal for a master information block (MIB) based on information carried on the synchronization signals;
receive, from the base station, the first demodulation reference signal for the MIB based on the first time-frequency structure;
receive, from the base station, configuration information for a second time-frequency structure of a second demodulation reference signal for physical downlink shared channel (PDSCH) by a higher layer signaling; and
receive, from the base station, the second demodulation reference signal for PDSCH based on the configuration information.

10. The terminal of claim 9, wherein the at least one processor is further configured to:
obtain a subcarrier spacing of a synchronization signal based on the synchronization signal; and
determine a subcarrier spacing for the first time-frequency structure of the first demodulation reference signal as the obtained subcarrier spacing of the synchronization signal.

11. The terminal of claim 9, wherein the at least one processor is further configured to:
perform a first channel estimation based on the received first demodulation reference signal;
obtain the MIB based on a result of the first channel estimation;
perform a second channel estimation based on the received second demodulation reference signal; and
obtain data on the PDSCH based on a result of the second channel estimation.

12. The terminal of claim 9,
wherein, when a subcarrier spacing for each resource element (RE) of the second time-frequency structure of the second demodulation reference signal is changed, a frequency-domain density and a time-domain density are maintained and a length of a cyclic prefix (CP) is changed,
wherein the frequency-domain density comprises frequency intervals between adjacent REs of downlink reference signals in a frequency-domain, and
wherein the time-domain density comprises time intervals between adjacent REs of downlink reference signals in a time-domain.

13. A base station in a wireless communication system, the base station comprising:
at least one transceiver; and
at least one processor operably coupled to the at least one transceiver, and configured to:
transmit, to a terminal, synchronization signals;
transmit, to the terminal, a first demodulation reference signal for a master information block (MIB) based on a first time-frequency structure, wherein the first time-frequency structure are identified based on information carried on the synchronization signals;
transmit, to the terminal, configuration information for a second time-frequency structure of a second demodulation reference signal for physical downlink shared channel (PDSCH) by a higher layer signaling; and
transmit, to the terminal, the second demodulation reference signal for PDSCH based on the configuration information.

14. The base station of claim 13, wherein the at least one processor is further configured to configure the first time-frequency structure of the first demodulation reference signal based on a subcarrier spacing of a synchronization signal.

15. The base station of claim 13, wherein the at least one processor is further configured to:
- transmit the MIB with the first demodulation reference signal on a first channel; and
- transmit data on the PDSCH with the second demodulation reference signal on a second channel.

16. The base station of claim 13,
- wherein, when a subcarrier spacing for each resource element (RE) of the second time-frequency structure of the second demodulation reference signal is changed, a frequency-domain density and a time-domain density are maintained and a length of cyclic prefix (CP) is changed,
- wherein the frequency-domain density comprises frequency intervals between adjacent REs of downlink reference signals in a frequency-domain, and
- wherein the time-domain density comprises time intervals between adjacent REs of downlink reference signals in a time-domain.

* * * * *